(12) United States Patent
Mukherjee

(10) Patent No.: US 8,644,703 B2
(45) Date of Patent: Feb. 4, 2014

(54) RESOURCE UTILIZATION METHOD AND SYSTEM

(75) Inventor: Amitava Mukherjee, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 389 days.

(21) Appl. No.: 13/031,662

(22) Filed: Feb. 22, 2011

(65) Prior Publication Data
US 2012/0213516 A1   Aug. 23, 2012

(51) Int. Cl.
*H04J 14/00* (2006.01)
*H04Q 11/00* (2006.01)

(52) U.S. Cl.
USPC .................................. 398/5; 398/49; 398/50

(58) Field of Classification Search
USPC ................................. 398/5, 49–50
See application file for complete search history.

(56) References Cited

U.S. PATENT DOCUMENTS

| | | | |
|---|---|---|---|
| 7,171,124 B2 | 1/2007 | Smith et al. | |
| 7,599,621 B2 | 10/2009 | Guy et al. | |
| 2004/0258409 A1* | 12/2004 | Sadananda | 398/50 |
| 2010/0040365 A1 | 2/2010 | Leung | |
| 2010/0329120 A1* | 12/2010 | Zhang et al. | 370/238 |
| 2012/0308224 A1* | 12/2012 | Li et al. | 398/5 |

OTHER PUBLICATIONS

Gond et al., Performance Evaluation of Wavelength Routed Optical Network with Wavelength Conversion, Journal of Telecommunications, vol. 2, Issue 1, Apr. 2010, pp. 110-114.
Pachnicke et al., Constraint-Based Routing in Path-Protected Translucent Optical Networks Considering Fiber Nonlinearities and Polarization Mode Dispersion, Proc. of SPIE vol. 7136 71364M-1, 2008, pp. 71364M-1-71364M-10.
Doverspike et al., Importance of Wavelength Conversion in an Optical Network, Optical Networks, vol. 2, No. 3, May/Jun. 2001, pp. 33-44.
Simmons et al., Network Design in Realistic "All-Optical" Backbone Networks, IEEE Communications Magazine, Nov. 2006, pp. 88-94.
Manousakis, et al., Joint Online Routing, Wavelength Assignment and Regenerator Allocation in Translucent Optical Networks, Journal of Lightwave Technology, vol. 28, No. 8, Apr. 15, 2010, pp. 1152-1163.
Manousakis, et al., Impairment-Aware Offline RWA for Transparent Optical Networks, IEEE INFOCOM 2009 proceedings, pp. 1557-1565.
Ramamurthy et al., Impact of Transmission Impairments on the Teletraffic Performance of Wavelength-Routed Optical Networks, Journal of Lightwave Technology, vol. 17, No. 10, Oct. 1999, pp. 1713-1723.
Zang et al., A Review of Routing and Wavelength Assignment Approaches for Wavelength-Routed Optical WDM Networks, Jan. 2000 Optical Networks Magazine, pp. 47-60.
Tomkos, et al., Performance Engineering of Metropolitan Area Optical Networks Through Impairment Constraint Routing, IEEE Optical Communications, Aug. 2004, pp. 540-547.

* cited by examiner

*Primary Examiner* — Leslie Pascal
(74) *Attorney, Agent, or Firm* — Schmeiser, Olsen & Watts LLP; John Pivnichny

(57) ABSTRACT

An optimal resource utilization method and system is disclosed. The method includes monitoring an optical network comprising optical cross connect (OXC) nodes comprising regenerators and connected by links. Communication paths each comprising a group of OXC nodes connected by links of said links are selected. Routing demands, working communication paths, and protection communication paths are selected. A computer processor assigns successive links a wave length and allocates regenerators to multiple successive links. The computer processor positions a first group of the regenerators along the working communication paths and positioning a second group of regenerators along the protection communication paths.

20 Claims, 8 Drawing Sheets

RESOURCE UTILIZATION METHOD AND SYSTEM

FIELD OF THE INVENTION

The present invention relates to a method and associated system for managing resource utilization through a regeneration constraint based heuristic.

BACKGROUND OF THE INVENTION

Modifying networks typically comprises an inefficient process with little flexibility. Accordingly, there exists a need in the art to overcome the deficiencies and limitations described herein above.

SUMMARY OF THE INVENTION

The present invention provides an optimal resource utilization method comprising: monitoring, by a computer processor of a computing system, an optical network comprising a plurality of optical cross connect (OXC) nodes connected by links, wherein said OXC nodes comprise regenerators; identifying, by said computer processor, sets of communication paths each comprising a group of OXC nodes of said OCX nodes connected by an associated group of links of said links, wherein each set of said sets comprises three shortest communication paths of said communication paths associated with connection demands; selecting, by said computer processor, routing demands for connection requests R(s,d), wherein each demand of said routing demands is associated with a 1+1 protection assumption and a set of said sets; selecting, by said computer processor from each said set, a working communication path and a protection communication path, wherein each said working communication path comprises a minimum number of regenerators of said regenerators with respect to each communication path in an associated set, and wherein each said protection communication path comprises a link disjoint minimum regeneration path; assigning, by said computer processor to two successive links of said links, a first wave length, wherein each link of said two successive links is associated with a different regenerator of said regenerators; allocating, by said computer processor, multiple regenerators of said regenerators to multiple successive links of said links; positioning, by said computer processor, a first group of said multiple regenerators along said working communication paths; and positioning, by said computer processor, a second group of said multiple regenerators along said protection communication paths.

The present invention provides a computer program product, comprising a computer readable hardware storage medium having a computer readable program code embodied therein, said computer readable program code comprising an algorithm that when executed by a computer processor of a computing system implements a method comprising: monitoring, by said computer processor, an optical network comprising a plurality of optical cross connect (OXC) nodes connected by links, wherein said OXC nodes comprise regenerators; identifying, by said computer processor, sets of communication paths each comprising a group of OXC nodes of said OCX nodes connected by an associated group of links of said links, wherein each set of said sets comprises three shortest communication paths of said communication paths associated with connection demands; selecting, by said computer processor, routing demands for connection requests R(s,d), wherein each demand of said routing demands is associated with a 1+1 protection assumption and a set of said sets; selecting, by said computer processor from each said set, a working communication path and a protection communication path, wherein each said working communication path comprises a minimum number of regenerators of said regenerators with respect to each communication path in an associated set, and wherein each said protection communication path comprises a link disjoint minimum regeneration path; assigning, by said computer processor to two successive links of said links, a first wave length, wherein each link of said two successive links is associated with a different regenerator of said regenerators; allocating, by said computer processor, multiple regenerators of said regenerators to multiple successive links of said links; positioning, by said computer processor, a first group of said multiple regenerators along said working communication paths; and positioning, by said computer processor, a second group of said multiple regenerators along said protection communication paths.

The present invention provides a computing system comprising a computer processor coupled to a computer-readable memory unit, said memory unit comprising instructions that when executed by the computer processor implements a method comprising: monitoring, by a computer processor of a computing system, an optical network comprising a plurality of optical cross connect (OXC) nodes connected by links, wherein said OXC nodes comprise regenerators; identifying, by said computer processor, sets of communication paths each comprising a group of OXC nodes of said OCX nodes connected by an associated group of links of said links, wherein each set of said sets comprises three shortest communication paths of said communication paths associated with connection demands; selecting, by said computer processor, routing demands for connection requests R(s,d), wherein each demand of said routing demands is associated with a 1+1 protection assumption and a set of said sets; selecting, by said computer processor from each said set, a working communication path and a protection communication path, wherein each said working communication path comprises a minimum number of regenerators of said regenerators with respect to each communication path in an associated set, and wherein each said protection communication path comprises a link disjoint minimum regeneration path; assigning, by said computer processor to two successive links of said links, a first wave length, wherein each link of said two successive links is associated with a different regenerator of said regenerators; allocating, by said computer processor, multiple regenerators of said regenerators to multiple successive links of said links; positioning, by said computer processor, a first group of said multiple regenerators along said working communication paths; and positioning, by said computer processor, a second group of said multiple regenerators along said protection communication paths.

The present invention advantageously provides a simple method and associated system capable of modifying networks.

DETAILED DESCRIPTION OF THE INVENTION

Figure 1:
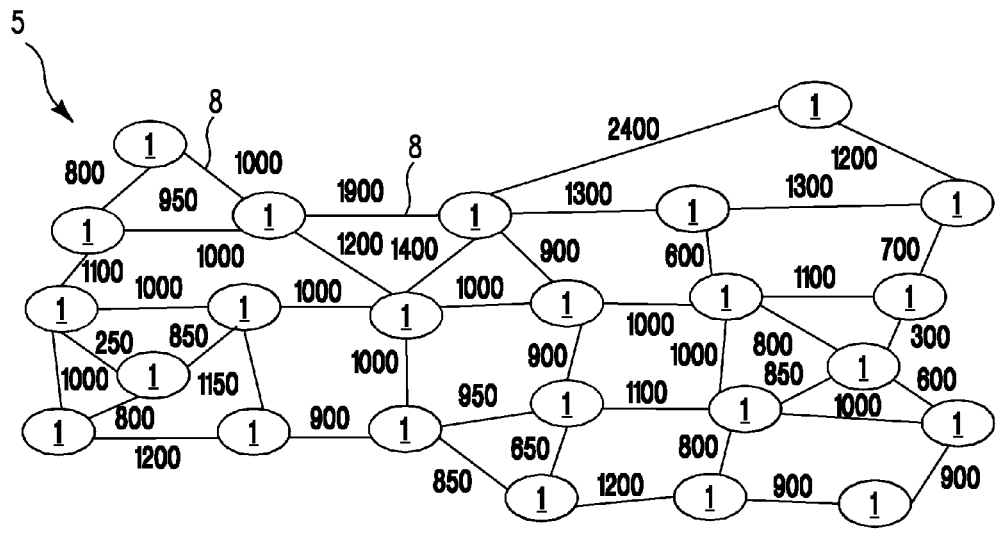
FIG. 1 illustrates an optical backbone network system for transmitting an optical signal, in accordance with embodiments of the present invention.

FIG. 1 illustrates an optical backbone network system 5 for transmitting an optical signal, in accordance with embodiments of the present invention. System 5 allocates regenerators in a fiber optic network by using a regeneration constraint based routing and wavelength assignment scheme process. System 5 comprises regenerators allocated as full-range wavelength converters. System 5 allows wavelength assignment to be subjected to a wavelength continuity constraint without any wavelength conversion. System 5 enables a shortest path routing process, a first-fit process, and a least-used wavelength assignment heuristics process. System 5 provides an estimate of a number of regenerators required in a network in future as well as specifying a type of fiber a number of regenerators required to meet design goals with a low network cost and better performance.

System 5 comprises optical cross connect (OCX) nodes 1 (as described in detail with respect to FIG. 2, infra) connected through links 35. System 5 enables:

1. A k-shortest path algorithm identifying a first three shortest paths for each demand in a set of connection requests (i.e., via system 5). For each demand (under a 1+1 protection assumption), a working path and a protection path is selected. The working path is selected from the first three shortest paths and comprises a path that includes a minimum number of regenerators. The protection path comprises a link-disjoint minimum regeneration path. Two link-disjoint paths per each source-destination pair are selected.
2. A process that includes:
A. Wavelength assignment in two successive links that do not share a regenerator (i.e., a wavelength converter) and must follow a wavelength continuity constraint (i.e., a same wavelength must be assigned to both successive links)
B. Allocation of regenerators (as wavelength converters) in the network of system 5 in order to route remaining demands. Two different wavelengths may be assigned to two successive links if they share a wavelength converter. Using a full-range wavelength conversion capability of regenerators (in this phase) allows a wavelength assignment to be carried out by an effective allocation of regenerators. The allocation of regenerators works adaptively to congestion in a network by identifying a most congested link. A most congested link is identified by calculating a link load (i.e., a number of times a link is being used in all paths for routing demands) and a path load (i.e., a sum of all link loads of all the links along the path).
3. An optical backbone network comprising a set of allocated regenerators positioned in the network. Regenerators are first positioned along working paths and then along protected paths starting from a path with minimum hops and gradually moving towards a path with maximum hops. Depending on a type of fiber installed in a service providers' backbone network, all wavelengths may not comprise a same optical reach. For example, some fiber types may comprise regions of very low dispersion leading to more nonlinear impairments and resulting in a wavelength in this region to include a reduced optical reach as compared to the rest of the system spectrum. As wavelength assignment is completed, varying optical reach is used for different assigned wavelengths.

System 5 includes the following network configurations associated with a long-haul network:

1. A physical topology comprising nodes 1 and bi-directional links 8.
2. An average link length (for links 8) is about 950 km.
3. An average optical reach is 2000-4000 km.
4. Each demand is characterized by a source-destination (s,d) node pair.
5. Given a fixed demand set, a factor regulating network cost comprises a number of intermediate regenerators needed along paths.
6. Regenerating nodes are connected to digital cross-connect (DXC) responsible for regeneration and add/drop of local traffic.

The following assumptions are related to network configurations:

1. Fibers are single mode fibers enabling longer reach of long-haul networks.
2. Network traffic is at a line rate (no grooming required).
3. A distribution of traffic demands is random.
4. A design is carried out under a 1+1 protection scheme.
5. Only in-node regenerations are considered.
6. Selective optical-electrical-optical (OEO) conversion is performed via the DXC for signal regeneration or wavelength conversion (i.e., solving wavelength contention).
7. All opaque OXC nodes 1 provide full-range wavelength conversion from any input wavelength to any other wavelengths.

System 5 allows regenerators to be allocated in a network as wavelength converters in order to achieve maximum wavelength utilization. Alternatively, regenerators may be allocated in all computed paths corresponding to a given demand set for the network in accordance with optical reach and using existing regenerators as wavelength converters. Allocating regenerators in the network as wavelength converters adds value to a design because an efficient allocation of wavelength converters in the network may yield very high network performance (i.e., there will be maximum resource utilization).

Figure 2:
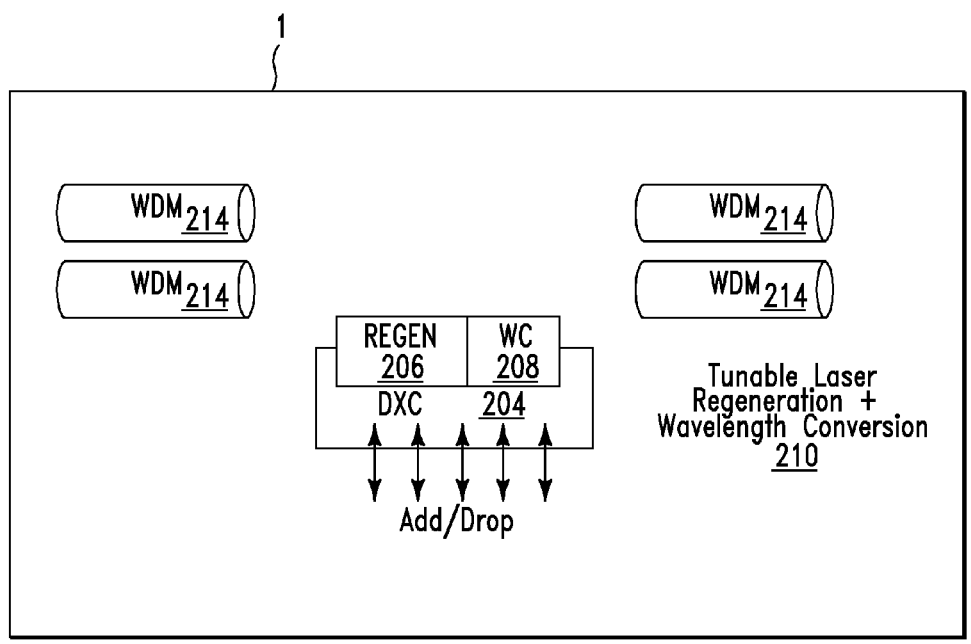
FIG. 2 illustrates a detailed view of the OCX nodes of FIG. 1, in accordance with embodiments of the present invention.

FIG. 2 illustrates a detailed view of OCX nodes 1 of FIG. 1, in accordance with embodiments of the present invention. OCX nodes 1 each comprise a transparent OXC node that includes a bank of regenerators 206, a digital cross-connect (DXC) circuit 204 (responsible for regeneration and add/drop of local traffic), long-reach lasers 210 connected to wavelength division multiplexer (WDM) links 214, and a wavelength conversion (WC) circuit 208. Long-reach lasers 210 are tunable. OCX node 1 enables a selective optical-electrical optical (OEO) conversion process performed via DXC 204 circuit in order to:

1. Perform a wavelength regeneration process each time an optical reach is passed. A driver for selective regeneration is assigned to transponders performing OEO conversion thereby regenerating only those channels requiring regeneration.

2. Perform a wavelength conversion (WC) process to solve wavelength contention. When looking at a single connection traversing the network in a transparent reach concept, regeneration is performed at each optical reach kilometer. The regeneration cuts a path into subsequent sub-paths, thereby adding freedom to a routing and wavelength assignment (WA) algorithm to assign different wavelengths to subsequent parts of the path (i.e., the wavelength continuity requirement is restricted to the sub-paths).

Figure 3:
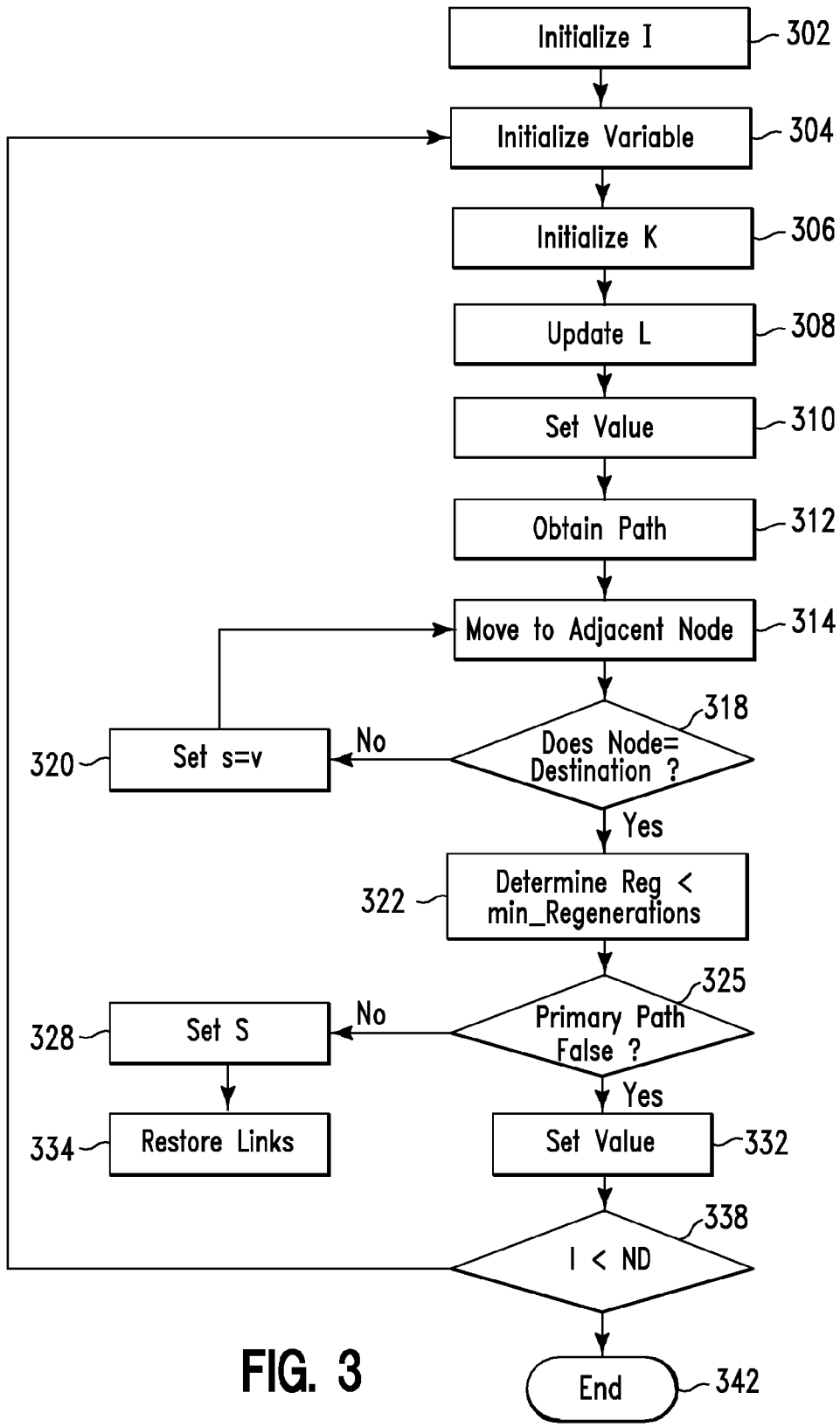
FIG. 3 illustrates an algorithm used by the system of FIG. 1 for implementing a K-shortest path routing process, in accordance with embodiments of the present invention.

FIG. 3 illustrates an algorithm used by system 5 of FIG. 1 for implementing a K-Shortest path routing process, in accordance with embodiments of the present invention. The algorithm describes that for every demand in a set of connection requests (under A 1+1 protection assumption), a working path and a protection path is selected. Using a k-shortest path algorithm (i.e., as described in detail, infra), a first three shortest paths for a demand are identified and a path associated with a minimum number of regenerations for a connection is selected (from the first three shortest paths) as a working path. Additionally, a link-disjoint minimum regeneration path is selected as a protection path. The algorithm of FIG. 3 receives the following inputs and generates the following outputs:

Inputs

A connected graph—G(V,E); requests (R) from a source s of the request to a destination d of the request—R(s,d); ND—a number of demands; and optical_reach—an average optical reach for all wavelengths.

Outputs

P—a list of primary routes (working paths) corresponding to requests in R and S—a list of link-disjoint protected routes corresponding to the requests in R.

In step 300, a computer processor (e.g., computer processor 91 of FIG. 11) initializes I (an iteration counter) by one and P and S by null (i.e., empty). In step 304, the computer processor initializes a variable (found_primary_path) as false and increases i by one (s is a source of an $i^{th}$ request and d is a destination of the $i^{th}$ request). In step 306, an iteration counter k is initialized by one and a two dimensional array L is initialized at null. The two dimensional array L stores paths from the source s to the destination d. In step 308, the $k^{th}$ shortest path from to d is added to the two dimensional array L and k is increased by one. Step 308 is repeated three times. In step 310, the computer processor sets a value of min_regenerations (min_regenerations stores a count of minimum number of regenerations required to service a demand from s to d and comprises a same value as a number of regenerators required) to infinite. In step 312, a path t is retrieved and removed from L. Additionally, a variable (dist) is initialized at zero and a variable (reg) is set to zero. The variable (dist) stores a distance travelled by an optical signal from its last regeneration. The variable (reg) stores a number of regenerators required by an associated path. In step 314, a signal is routed to an adjacent node v of the source s in the path t and in the direction from source s towards destination d. A value of the variable (dist) is updated by the sum of the distances and link lengths between s to v. If value of the variable (dist) is greater than a value of optical_reach then regeneration is required. A value of variable (reg) is increased by 1 and a value of the variable (dist) is set to zero. In step 325, it is determined if a node v is equal to the destination d. If the node v is not equal to the destination d then a value of the source s is set to a value node v and step 314 is repeated. If the node v is equal to the destination d then in step 322, it is determined that a value of variable (reg) is less than a value of min_regenerations. The value of min_regenerations is set to the value of variable (reg) and a value of min_reg_path u is set to path t(i.e., min_reg_path stores the path from s to d requiring a least number of regenerations). Steps 312-322 are repeated three times. In step 325, it is determined if found_primary_path is false.

If found_primary_path is false then in step 322, a value of temp to is set to min_reg_path (i.e., the min_reg_path is added to P) and found_primary_path is set to true. Found_primary_path will become true when a path requiring least number of regenerations is found. Steps 306-332 are repeated two times. In step 338, if i≤ND then all demands have not been serviced and step 304 is repeated.

If found_primary_path is not false then in step 328 min_reg_path is added to S. In step 334, all links in temp are restored to G.

Figure 4:
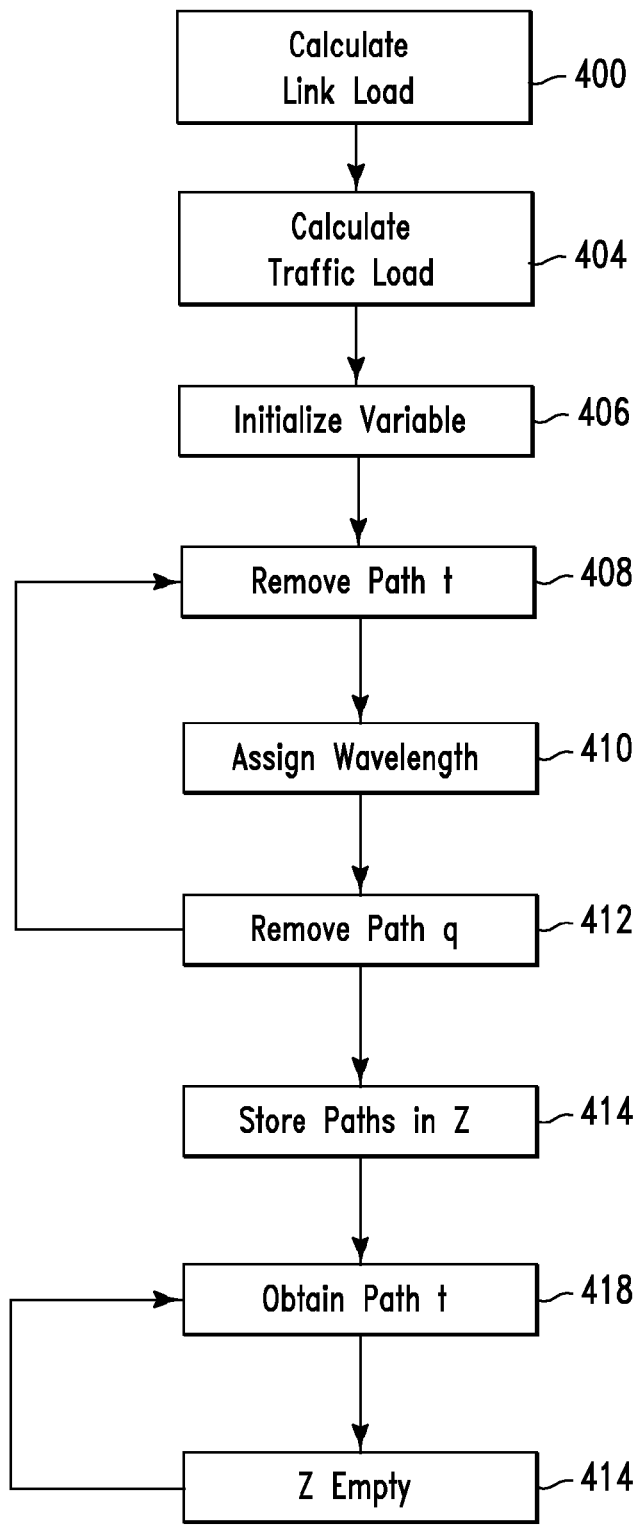
FIG. 4 illustrates an algorithm used by the system 5 of FIG. 1 for implementing a wavelength assignment process enabled by an optimal allocation of regenerators, in accordance with embodiments of the present invention.

FIG. 4 illustrates an algorithm used by system 5 of FIG. 1 for implementing a wavelength assignment process enabled by an optimal allocation of regenerators, in accordance with embodiments of the present invention. The algorithm describes regenerators being allocated in a network as full-range wavelength converters. Wavelength assignment in two successive links that do not share a regenerator (a wavelength converter) must follow a wavelength continuity constraint (i.e., a same wavelength must be assigned to both links). Alternatively, two different wavelengths may be assigned to two successive links if they share a wavelength converter. The algorithm of FIG. 4 is associated with congestion in the network. A most congested link is identified by calculating a link load (i.e., a number of times a link is being used in all paths for routing demands) and a most congested path by calculating path load (i.e., a sum of all link loads of all links along a path). The algorithm of FIG. 4 receives the following inputs and generates the following outputs:

Inputs

A connected graph—G(V,E); requests (R) from a source s of the request to a destination d of the request—R(s,d); a list P of primary routes corresponding to requests; a list S of link-disjoint protected paths corresponding to the requests R; and a number W of wavelengths per fiber with the wavelengths numbered from 1 to W.

Outputs

A set WC of nodes acting as wavelength converters which are allocated a regenerator for full-range wavelength conversion.

In step 400, a computer processor (e.g., computer processor 91 of FIG. 11) calculates a link load or traffic load process for every unordered node pair (u,v) for a request originated from a source s to a destination d. A link load of a particular path comprises a number of paths associated with a link. In step 404, the computer processor calculates a path load for every path t-p. In step 406, a variable blocked is initialized to zero. The variable blocked stores a number of demands that are unable to be serviced. A two dimensional array A is initialized to null (i.e., empty). The two dimensional array A stores paths that may be successfully serviced. A two dimensional array L stores a path from the source s to the destination d. The two dimensional array L comprises a temporary storage for the primary path P. The two dimensional array L is assigned (initialized) to P. In step 408, a path t is removed from the two dimensional array L. In step 410, a wavelength w is assigned to path t by a First-Fit process (i.e., a first available wavelength w is used. In step 412, a path q is removed from two dimensional array L. If two dimensional array L is not empty then there are paths requiring assigned wavelengths and step 408 is repeated. If two dimensional array L is empty then in step 414, a set of all wavelength unassigned paths are stored in Z. In step 418, path t is obtained from Z (Z=Z−t). If path t includes any continuous free wavelength then the wavelength is assigned to path t. If there is any link in path t that includes no available wavelength then a demand may not be serviced and blocked. If path t does include regenerators then path t is split up into smaller segments starting from source s to the regenerator:

1. If there is a free wavelength available then assign that wavelength and move to a next segment.
2. Or else if there is a previous link, a variable prey is the wavelength assigned to the previous link.
3. Or else select a least used wavelength between the two segments and assign it variable prey.
4. Let u be a current node and node v be a next adjacent node. If variable prey is available on a current link (u-v) then assign to variable prey. Else if a least used wavelength for this segment is available then assign that wavelength and store the value in prey.

In step 422, if Z is not empty and still includes unassigned paths then step 418 is repeated.

Figure 5:
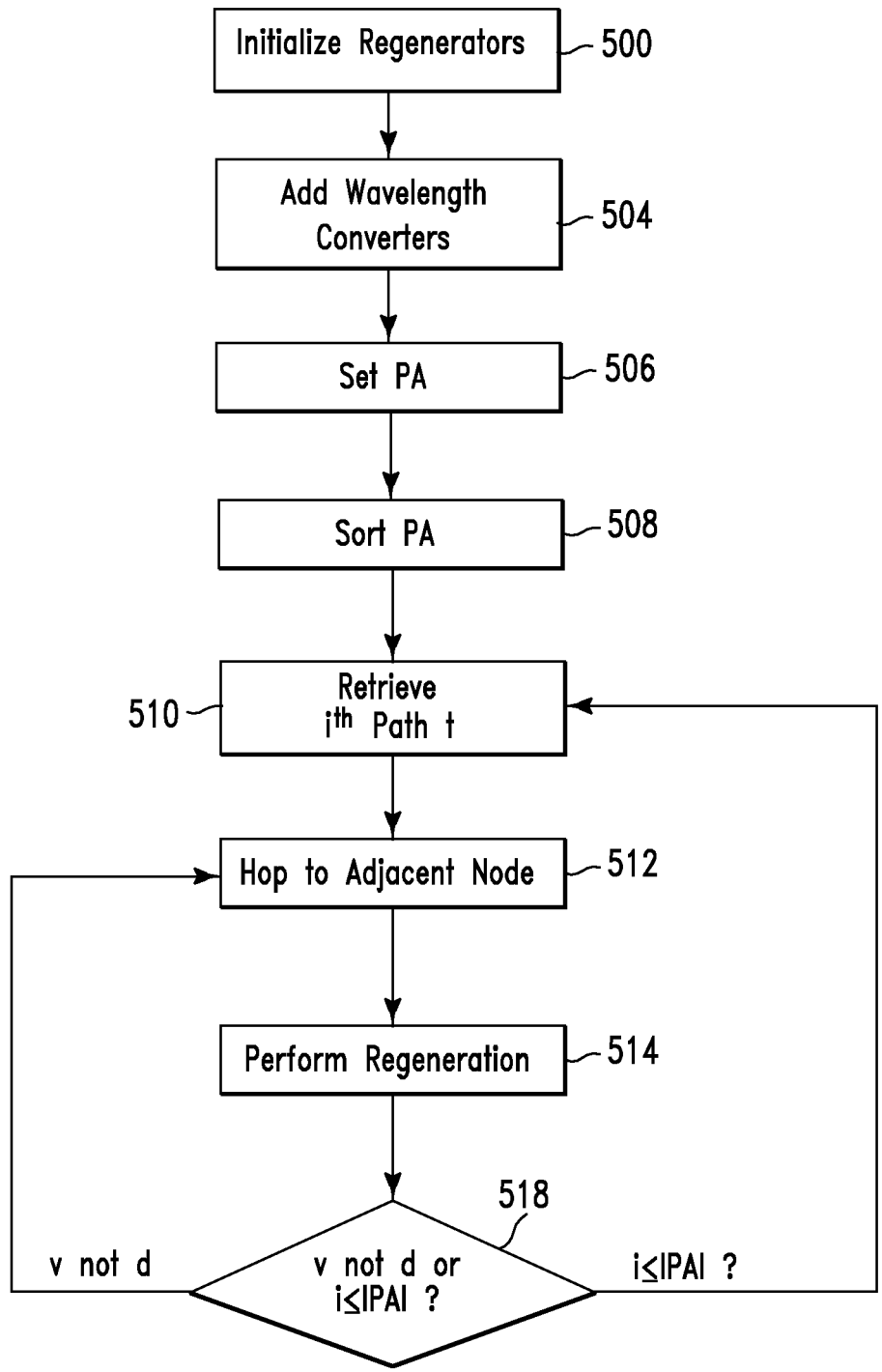
FIG. 5 illustrates an algorithm used by the system of FIG. 1 for implementing a process enabling a final positioning of regenerators, in accordance with embodiments of the present invention.

FIG. 5 illustrates an algorithm used by system 5 of FIG. 1 for implementing a process enabling a final positioning of regenerators, in accordance with embodiments of the present invention. In the process illustrated in FIG. 5, additional regenerators (i.e., nodes) are allocated to a network. The additional regenerators are placed globally over the network. Therefore as any signal transmitted over paths routed through additional regenerators will be regenerated (whether needed or not). An order in which routes are chosen for regenerator site selection, affects a network design and cost. A network design may include first allocating regenerators along working routes and then along protected paths starting from a path with minimum hops and gradually moving towards a path with maximum hops. Depending on a type of fiber installed in a carrier's network, all wavelengths may not have a same optical reach. Some fiber types may have regions of very low dispersion leading to more nonlinear impairments and resulting in a wavelength in this region to have a reduced optical reach as compared to the rest of the system spectrum. As wavelength assignment is completed, a varying optical reach for different assigned wavelengths may be implemented. The algorithm of FIG. 5 receives the following inputs and generates the following outputs:

Inputs

A connected graph—G(V,E); requests (R) from a source s of the request to a destination d of the request—R(s,d); a list P of primary routes corresponding to requests; a list S of link-disjoint protected paths corresponding to the requests R; a set A of all paths comprising assigned wavelengths; an average optical reach (optical_reach) for all wavelengths; and a set WC of nodes acting as wavelength converters which are allocated a regenerator for full-range wavelength conversion.

Outputs

Output: a set (Regenerators) of all nodes in the network which are allocated a regenerator=.

In step 500, a computer processor (e.g., computer processor 91 of FIG. 11) initializes the set (Regenerators) to null (i.e., initialized to an empty set). In step 504, elements of the set WC of wavelength converters are added to the set (Regenerators). In step 506, a set PA is set equal to P∩A (i.e., P is intersected with A). Set PA comprises a set of paths comprising paths which are present in both the sets P and A. Therefore set PA comprises primary paths for which demands can be successfully serviced. In step 508, set PA is sorted in an ascending order in accordance with a number of hops. Additionally, an iteration counter i is initialized to 1. In step 510, an $i^{th}$ path t (i.e., from sorted set PA) is retrieved. In step 512, a signal hops to an adjacent node of u (v) towards destination d in the path t between u and v. In step 514, a regeneration process is performed. In step 518, it is determined if destination d is not equal to node (v) or i≤|PA|. If destination d is not equal to node (v) then step 512 is repeated. If i≤|PA| then step 510 is repeated.

Figure 6:
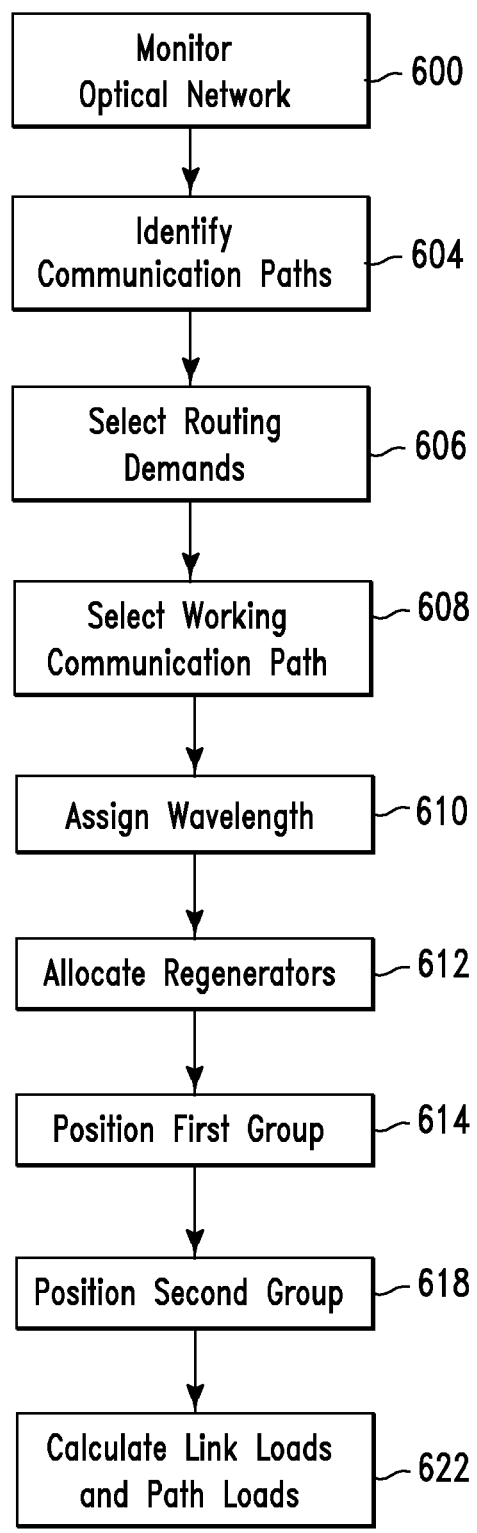
FIG. 6 illustrates an algorithm for implementing an optical backbone network system comprising OCX nodes, in accordance with embodiments of the present invention.

FIG. 6 illustrates an algorithm for implementing optical backbone network system 5 comprising OCX nodes 1, in accordance with embodiments of the present invention. In step 600, a computer processor (e.g., computer processor 91 of FIG. 11) monitors optical backbone network system 5 comprising OXC nodes 1 connected by links 8 (of FIG. 1. The OXC nodes comprise regenerators 206 (as illustrated in FIG. 2). In step 604, the computer processor identifies sets of communication paths each comprising a group of OXC nodes (of OCX nodes 1) connected by an associated group of links (of links 8). Each set of communication paths include a three shortest communication paths of the communication paths associated with connection demands. In step 606, the computer processor selects routing demands for connection requests R(s,d). Each routing demand is associated with a 1+1 protection assumption and a set of the sets of communication paths. In step 608, the computer processor selects (from each set) a working communication path and a protection communication path. Each working communication path comprises a minimum number of regenerators with respect to each communication path in an associated set. Each protection communication path comprises a link disjoint minimum regeneration path. In step 610, the computer processor assigns (to two successive links) a first wave length. Each link (of the two successive link) is associated with a different regenerator. In step 612, the computer processor allocates multiple regenerators to multiple successive links. In step 614, the computer processor positions a first group (of the multiple regenerators) along the working communication paths. In step 618, the computer processor positions a second group (of the multiple regenerators) along the protection communication paths. In step 622, the computer processor calculates link loads and path loads. Each link load includes a number of times that each link is used in all communication paths. Each path load includes a sum of all link loads existing within each path of the communication paths.

FIGS. 7-10 illustrate graphs detailing simulation example data associated with executing the algorithms of FIGS. 3-6 with respect to system 5 of FIG. 1, in accordance with embodiments of the present invention. System 5 of FIG. 1 includes 24 OCX nodes 1 and 43 duplex links 8. All links 8 between OCX nodes 1 include a same number of wavelength channels. Additionally, blocking ratio has been calculated (i.e., a number of connection requests blocked/number of demands) for different number of wavelength channels (a number of demands has been fixed).

Figure 7:
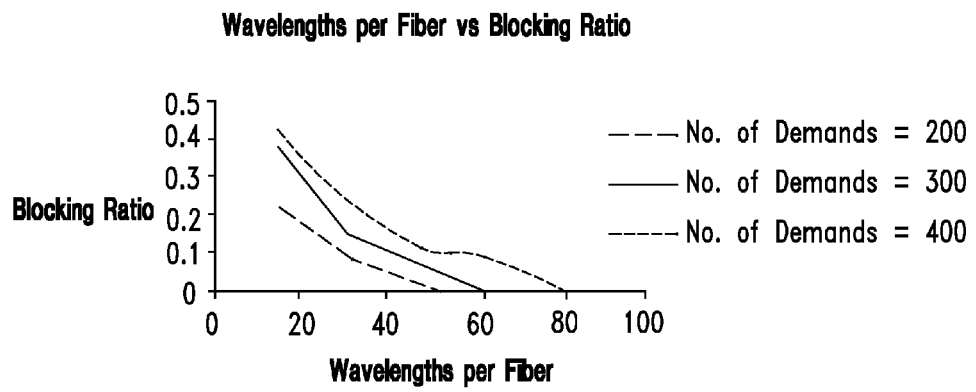
FIGS. 7-10 illustrate graphs detailing simulation example data associated with executing the algorithms of FIGS. 3-6 with respect to the system of FIG. 1, in accordance with embodiments of the present invention.

FIG. 7 illustrates a graph comprising a number of wavelengths per fiber versus a blocking ratio curve for different demand sizes. A number of wavelengths per fiber to achieve a certain blocking probability may be determined (using the graph of FIG. 7) when the specification of a fiber is not known.

Figure 8:
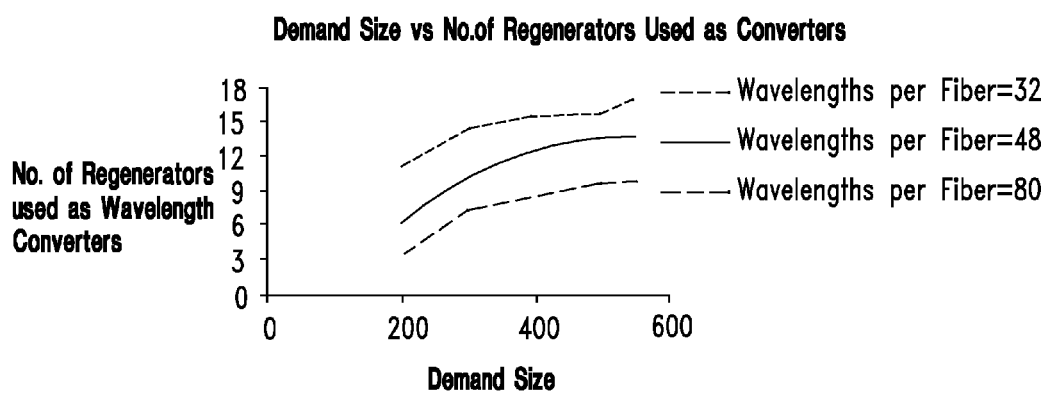

FIG. 8 illustrates a graph comprising a demand size versus a number of regenerators (used as wavelength converters) for a different number of wavelengths per fiber.

Figure 9:
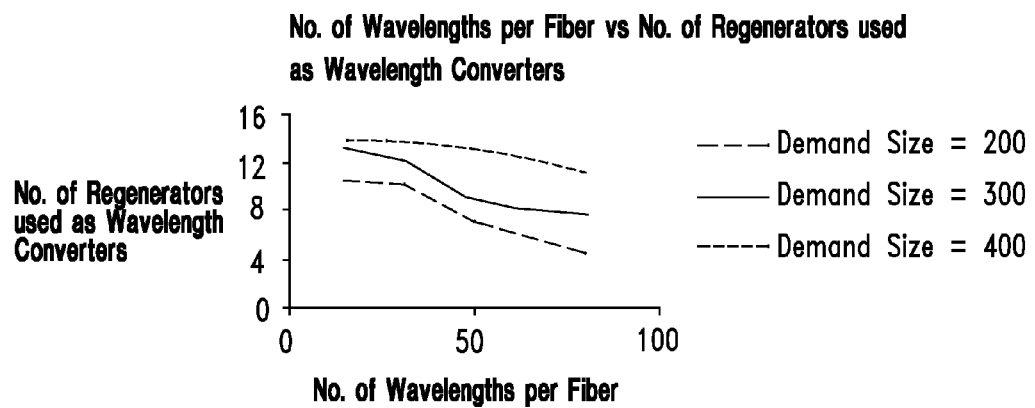

FIG. 9 illustrates a graph comprising a number of wavelengths per fiber versus a number of regenerators (used as wavelength converters) for various demand sizes. FIG. 9 illustrates that big differences exist in a number of regenerating nodes when increasing a number of wavelengths per fiber. A number of regenerators depends on the average optical reach.

Figure 10:
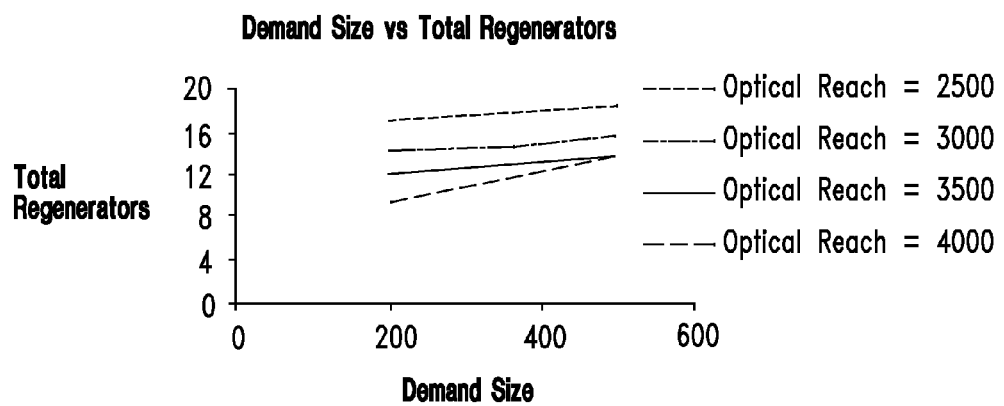

FIG. 10 illustrates a graph comprising a number of wavelengths per fiber versus a number of regenerators (used as Wavelength Converters) for different demand sizes. FIG. 10 illustrates that a number of regenerators required for an optical reach of 4000 km is only slightly less than that required for an optical reach of 2500 km (i.e., for a same demand size).

Figure 11:
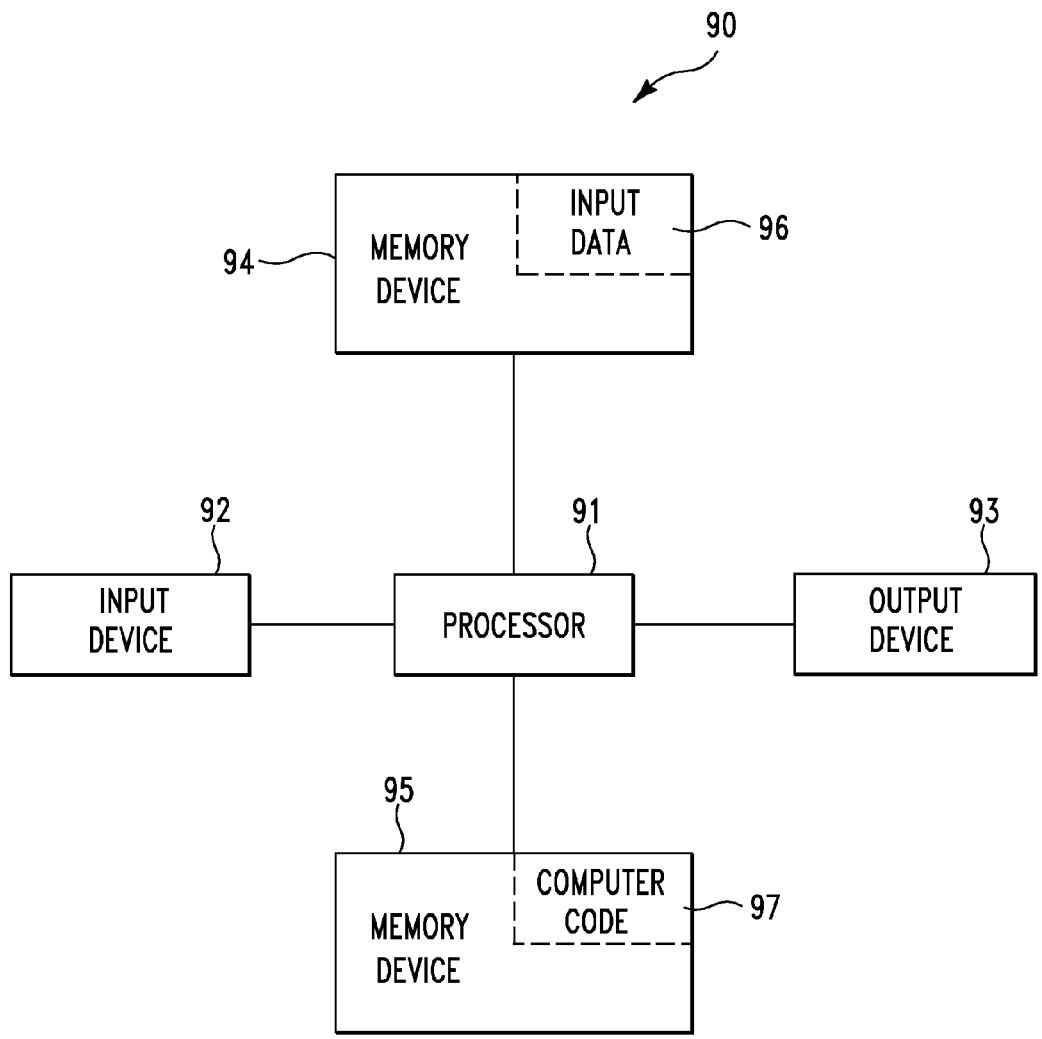
FIG. 11 illustrates a computer apparatus used for implementing an optical backbone network system comprising OCX nodes, in accordance with embodiments of the present invention.

FIG. 11 illustrates a computer apparatus 90 used for implementing an optical backbone network system comprising OCX nodes, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be any type of computer readable hardware storage medium including, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-6) for implementing an optical backbone network system comprising OCX nodes. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 11) may comprise the algorithms of FIGS. 3-6 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to implement an optical backbone network system comprising OCX nodes. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for implementing an optical backbone network system comprising OCX nodes. In another embodiment, the invention provides a method that performs the process steps of the invention on a subscription, advertising, and/or fee basis. That is, a service provider, such as a Solution Integrator, could offer to implement an optical backbone network system comprising OCX nodes. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. An optimal resource utilization method comprising:
identifying, by a computer processor of a computing system, sets of communication paths each comprising a group of optical cross connect (OXC) nodes of OCX nodes connected by an associated group of links of links connecting all of said OCX nodes, wherein each set of said sets comprises three shortest communication paths of said communication paths associated with connection demands, wherein said OCX nodes are comprised by an optical network, and wherein said OXC nodes comprise regenerators and wavelength converters;
selecting, by said computer processor for said sets, routing demands for connection requests R(s,d) associated with said communication paths, wherein each demand of said routing demands is associated with a 1+1 protection assumption and a set of said sets;
selecting, by said computer processor from each said set, a working communication path and a protection communication path, wherein each said working communication path comprises a minimum number of regenerators of said regenerators with respect to each communication path in an associated set, and wherein each said protection communication path comprises a link disjoint minimum regeneration path, wherein a first two successive links of said links do not share a same regenerator of said regenerators;
first assigning, by said computer processor to said first two successive links of said links based on each link of said first two successive links not sharing a same regenerator of said regenerators, a first same wave length;
allocating, by said computer processor based on each link of said first two successive links not sharing a same regenerator of said regenerators, multiple regenerators of said regenerators to multiple successive links of said links;
assigning, by said computer processor based on said allocating, a first group of said multiple regenerators along said working communication paths;
assigning, by said computer processor based on said allocating, a second group of said multiple regenerators along said protection communication paths; and
second assigning to said multiple successive links, by said computer processor based on said allocating, said positioning said first group, and said positioning said second group, multiple differing wavelengths.

2. The method of claim 1, further comprising:
calculating, by said computer processor based on said routing demands, link loads, wherein each link load of said link loads comprises a number of times that each link of said links is used in all communication paths of said sets of communication paths; and calculating, by said computer processor based on said routing demands, path loads, wherein each path load of said path loads comprises a sum of all link loads of said link loads existing within each path of said communication paths.

3. The method of claim 1, wherein said identifying, said selecting said routing demands, and said selecting said working communication path and said protection communication path further comprise:
receiving, by said computer processor, a connected graph G(V,E), said connection requests R(s,d) from a source (s) of an ith request of the connection requests to a destination (d) of said ith request of the connection requests, a number of said routing demands (ND), and an optical reach comprising an average optical reach for all wavelengths;
initializing, by said computer processor, an iteration counter (i);
initializing, by said computer processor, a variable (found_primary_path) as false;
increasing, by said computer processor, a value of said iteration counter (i) by one;
initializing, by said computer processor, an iteration counter (k);
first increasing, by said computer processor, a value of said iteration counter (k) by one, wherein said first increasing results in k+1;
initializing, by said computer processor, a two dimensional array (L), wherein said two dimensional array (L) stores paths from said source to said destination;
adding, by said computer processor, a $k^{th}$ shortest path from said source (s) to said destination (d) to said two dimensional array (L);
second increasing, by said computer processor, said value of said iteration counter (k) by one, wherein said second increasing results in k+2;
setting, by said computer processor, a value of a variable (mr) to an infinite value, wherein said value (mr) comprises a minimum number of regenerations (min_regenerations) required to service a demand from said source (s) to said destination (d);
retrieving, by said computer processor, a path (t) of said paths;
removing, by said computer processor, path (t) from said two dimensional array (L);
initializing, by said computer processor, a variable (dist) and a variable (reg) to zero, wherein said variable (dist) stores a distance travelled by an optical signal from a last regeneration, and wherein said variable (reg) stores a number of regenerators required by said path (t);
initializing, by said computer processor, an array (mr_path), wherein said array (mr_path) stores a path from said source (s) to said destination (d) requiring a minimum number of regenerations. initializing, by said computer processor, an array (temp), wherein said array (temp) is used for temporary storage;
moving, by said computer processor, to an adjacent node (v) of said source (s) in the path (t) and in the direction from said source (s) towards said destination (d) to calculate a distance travelled by the optical signal upon reaching the adjacent node (v) from a last regeneration node, wherein said moving determines if a regeneration of the optical signal is required; and
updating, by said computer processor, a value of said variable (dist) by a sum of distances and link lengths between said source (s) to said adjacent node (v),
wherein said first assigning and said second assigning are based on said link lengths.

4. The method of claim 3, further comprising:
determining, by said computer processor, that said variable (dist) is greater than a variable (optical_reach);
increasing, by said computer processor, a value of said variable (reg) by 1;
setting, by said computer processor, a value of said variable (dist) to zero;
determining, by said computer processor, that said adjacent node (v) is not a destination; and
setting, by said computer processor, a value of said source (s) to said adjacent node (v).

5. The method of claim 4, further comprising
determining, by said computer processor, that said value of said variable (reg) is greater than said value of said variable (mr);
setting, by said computer processor, said value of variable (mr) to said value of said variable (reg); and
setting, by said computer processor, a value of said array (mr_path) to the value of said path (t).

6. The method of claim 3, further comprising:
determining, by said computer processor, that said value of said variable (found_primary _path) is false;
adding, by said computer processor, the value of said array (mr_path) to a two-dimensional array (P); and
setting, by said computer processor, said value of said variable (found_primary_path) to true.

7. The method of claim 6, further comprising:
removing, by said computer processor, all links that within said array (temp) from the said connected graph G(V,E).

8. The method of claim 6, further comprising:
adding, by said computer processor, the value of said array (mr_path) to a two-dimensional array (S); and
adding, by said computer processor, all links that are in said array (temp) to the said connected graph G(V,E).

9. The method of claim 3, further comprising:
determining, by said computer processor, that said value of said iteration counter (i) is less than or equal to said number of said routing demands (ND); and
repeating, by said computer processor if said value of said iteration counter (i) is not equal to said number of said routing demands (ND), said initializing said iteration counter (i), said initializing said variable (found_primary_path), said increasing said value of said iteration counter (i) by one, said initializing said iteration counter (k), said first increasing, said initializing said two dimensional array (L), said adding, said second increasing, said setting, said retrieving, said removing, said initializing said variable (dist) and said variable (reg) to zero, said initializing said array (mr_path), said initializing said array (temp), said moving, and said updating.

10. The method of claim 1, further comprising:
providing at least one support service for at least one of creating, integrating, hosting, maintaining, and deploying computer-readable code in said computing system, wherein the code in combination with the computing system is capable of performing: said monitoring, said identifying, said selecting said routing demands, said selecting said working communication path and said protection communication path, said assigning, said allocating, said positioning said first group, and said positioning said second group.

11. A computer program product, comprising a computer readable hardware storage medium having a computer readable program code embodied therein, said computer readable program code comprising an algorithm that when executed by a computer processor of a computing system implements a method comprising:

identifying, by said computer processor, sets of communication paths each comprising a group of optical cross connect (OXC) nodes of OCX nodes connected by an associated group of links of links connecting all of said OCX nodes, wherein each set of said sets comprises three shortest communication paths of said communication paths associated with connection demands, wherein said OCX nodes are comprised by an optical network, and wherein said OXC nodes comprise regenerators and wavelength converters;

selecting, by said computer processor for said sets, routing demands for connection requests R(s,d) associated with said communication paths, wherein each demand of said routing demands is associated with a 1+1 protection assumption and a set of said sets;

selecting, by said computer processor from each said set, a working communication path and a protection communication path, wherein each said working communication path comprises a minimum number of regenerators of said regenerators with respect to each communication path in an associated set, and wherein each said protection communication path comprises a link disjoint minimum regeneration path, wherein a first two successive links of said links do not share a same regenerator of said regenerators;

first assigning, by said computer processor to said first two successive links of said links based on each link of said first two successive links not sharing a same regenerator of said regenerators, a first same wave length;

allocating, by said computer processor based on each link of said first two successive links not sharing a same regenerator of said regenerators, multiple regenerators of said regenerators to multiple successive links of said links;

assigning, by said computer processor based on said allocating, a first group of said multiple regenerators along said working communication paths;

assigning, by said computer processor based on said allocating, a second group of said multiple regenerators along said protection communication paths; and second assigning to said multiple successive links, by said computer processor based on said allocating, said positioning said first group, and said positioning said second group, multiple differing wavelengths.

12. The computer program product of claim 11, wherein said method further comprises:

calculating, by said computer processor based on said routing demands, link loads, wherein each link load of said link loads comprises a number of times that each link of said links is used in all communication paths of said sets of communication paths; and calculating, by said computer processor based on said routing demands, path loads, wherein each path load of said path loads comprises a sum of all link loads of said link loads existing within each path of said communication paths.

13. The computer program product of claim 11, wherein said identifying, said selecting said routing demands, and said selecting said working communication path and said protection communication path further comprise:

receiving, by said computer processor, a connected graph G(V,E), said connection requests R(s,d) from a source (s) of an ith request of the connection requests to a destination (d) of said ith request of the connection requests, a number of said routing demands (ND), and an optical reach comprising an average optical reach for all wavelengths;

initializing, by said computer processor, an iteration counter (i);

initializing, by said computer processor, a variable (found_primary_path) as false;

increasing, by said computer processor, a value of said iteration counter (i) by one;

initializing, by said computer processor, an iteration counter (k);

first increasing, by said computer processor, a value of said iteration counter (k) by one, wherein said first increasing results in k+1;

initializing, by said computer processor, a two dimensional array (L), wherein said two dimensional array (L) stores paths from said source to said destination;

adding, by said computer processor, a $k^{th}$ shortest path from said source (s) to said destination (d) to said two dimensional array (L);

second increasing, by said computer processor, said value of said iteration counter (k) by one, wherein said second increasing results in k+2;

setting, by said computer processor, a value of a variable (mr) to an infinite value, wherein said value (mr) comprises a minimum number of regenerations (min_regenerations) required to service a demand from said source (s) to said destination (d);

retrieving, by said computer processor, a path (t) of said paths;

removing, by said computer processor, path (t) from said two dimensional array (L);

initializing, by said computer processor, a variable (dist) and a variable (reg) to zero, wherein said variable (dist) stores a distance travelled by an optical signal from a last regeneration, and wherein said variable (reg) stores a number of regenerators required by said path (t);

initializing, by said computer processor, an array (mr_path), wherein said array (mr_path) stores a path from said source (s) to said destination (d) requiring a minimum number of regenerations. initializing, by said computer processor, an array (temp), wherein said array (temp) is used for temporary storage;

moving, by said computer processor, to an adjacent node (v) of said source (s) in the path (t) and in the direction from said source (s) towards said destination (d) to calculate a distance travelled by the optical signal upon reaching the adjacent node (v) from a last regeneration node, wherein said moving determines if a regeneration of the optical signal is required; and updating, by said computer processor, a value of said variable (dist) by a sum of distances and link lengths between said source (s) to said adjacent node (v), wherein said first assigning and said second assigning are based on said link lengths.

14. The computer program product of claim 13, wherein said method further comprises:

determining, by said computer processor, that said variable (dist) is greater than a variable (optical_reach);

increasing, by said computer processor, a value of said variable (reg) by 1;

setting, by said computer processor, a value of said variable (dist) to zero;

determining, by said computer processor, that said adjacent node (v) is not a destination; and setting, by said computer processor, a value of said source (s) to said adjacent node (v).

15. The computer program product of claim 14, wherein said method further comprises:
- determining, by said computer processor, that said value of said variable (reg) is greater than said value of said variable (mr);
- setting, by said computer processor, said value of variable (mr) to said value of said variable (reg); and
- setting, by said computer processor, a value of said array (mr_path) to the value of said path (t).

16. The computer program product of claim 13, wherein said method further comprises:
- determining, by said computer processor, that said value of said variable (found_primary_path) is false;
- adding, by said computer processor, the value of said array (mr_path) to a two-dimensional array (P); and
- setting, by said computer processor, said value of said variable (found_primarypath) to true.

17. The computer program product of claim 16, wherein said method further comprises:
- removing, by said computer processor, all links that within said array (temp) from the said connected graph G(V,E).

18. The computer program product of claim 16, wherein said method further comprises:
- adding, by said computer processor, the value of said array (mr_path) to a two-dimensional array (S); and
- adding, by said computer processor, all links that are in said array (temp) to the said connected graph G(V,E).

19. The computer program product of claim 13, wherein said method further comprises:
- determining, by said computer processor, that said value of said iteration counter (i) is less than or equal to said number of said routing demands (ND); and
- repeating, by said computer processor if said value of said iteration counter (i) is not equal to said number of said routing demands (ND), said initializing said iteration counter (i), said initializing said variable (found_primary_path), said increasing said value of said iteration counter (i) by one, said initializing said iteration counter (k), said first increasing, said initializing said two dimensional array (L), said adding, said second increasing, said setting, said retrieving, said removing, said initializing said variable (dist) and said variable (reg) to zero, said initializing said array (mr_path), said initializing said array (temp), said moving, and said updating.

20. A computing system comprising a computer processor coupled to a computer-readable memory unit, said memory unit comprising instructions that when executed by the computer processor implements a method comprising:
- identifying, by said computer processor, sets of communication paths each comprising a group of optical cross connect (OXC) nodes of OCX nodes connected by an associated group of links of links connecting all of said OCX nodes, wherein each set of said sets comprises three shortest communication paths of said communication paths associated with connection demands, wherein said OCX nodes are comprised by an optical network, and wherein said OXC nodes comprise regenerators and wavelength converters;
- selecting, by said computer processor for said sets, routing demands for connection requests R(s,d) associated with said communication paths, wherein each demand of said routing demands is associated with a 1+1 protection assumption and a set of said sets;
- selecting, by said computer processor from each said set, a working communication path and a protection communication path, wherein each said working communication path comprises a minimum number of regenerators of said regenerators with respect to each communication path in an associated set, and wherein each said protection communication path comprises a link disjoint minimum regeneration path , wherein a first two successive links of said links do not share a same regenerator of said regenerators;
- first assigning, by said computer processor to said first two successive links of said links based on each link of said first two successive links not sharing a same regenerator of said regenerators, a first same wave length;
- allocating, by said computer processor based on each link of said first two successive links not sharing a same regenerator of said regenerators, multiple regenerators of said regenerators to multiple successive links of said links;
- assigning, by said computer processor based on said allocating, a first group of said multiple regenerators along said working communication paths;
- assigning, by said computer processor based on said allocating, a second group of said multiple regenerators along said protection communication paths; and
- second assigning to said multiple successive links, by said computer processor based on said allocating, said positioning said first group, and said positioning said second group, multiple differing wavelengths.

* * * * *